United States Patent [19]
Sørensen

[11] Patent Number: 5,942,975
[45] Date of Patent: Aug. 24, 1999

[54] METHOD AND A DEVICE FOR SENSING THE DISTANCE BETWEEN A FIRST OBJECT AND A SECOND OBJECT

[76] Inventor: Jørn Sørensen, Bakke Allé 1, 8230 Åbyhøj, Denmark

[21] Appl. No.: 09/043,669
[22] PCT Filed: Sep. 25, 1996
[86] PCT No.: PCT/DK96/00408
   § 371 Date: Mar. 25, 1998
   § 102(e) Date: Mar. 25, 1998
[87] PCT Pub. No.: WO97/12174
   PCT Pub. Date: Apr. 3, 1997

[30] Foreign Application Priority Data

Sep. 25, 1995 [DK] Denmark .................................. 1067/95

[51] Int. Cl.$^6$ .................................................. G08B 13/26
[52] U.S. Cl. .......................................... 340/562; 318/478
[58] Field of Search ..................................... 340/562, 561, 340/563; 318/16, 54, 57, 65, 478, 479, 563, 565

[56] References Cited

U.S. PATENT DOCUMENTS

| | | | |
|---|---|---|---|
| 3,829,850 | 8/1974 | Guetersloh | 340/563 |
| 3,836,828 | 9/1974 | Siegel | 317/146 |
| 3,896,425 | 7/1975 | Erichsen | 340/563 |
| 3,947,734 | 3/1976 | Fyler | 340/563 |
| 4,345,167 | 8/1982 | Calvin | 307/308 |
| 4,831,279 | 5/1989 | Ingraham | 307/116 |
| 5,081,406 | 1/1992 | Hughes et al. | 318/478 |
| 5,189,377 | 2/1993 | Rhoades et al. | 324/662 |
| 5,764,145 | 6/1998 | Hansson et al. | 340/562 |

*Primary Examiner*—Thomas Mullen
*Assistant Examiner*—Toan Pham

[57] ABSTRACT

A method and device for sensing the distance between a first object and a second object so as to activate or facilitate predetermined actions when the distance has attained a certain value. A person (1) (first object) holds a handle (2) of a power tool, the handle being connected to a function generator (6) for a signal in turn connected to a unit (7) for encoding or modulating the signal. A capacitance (C1) exists between the hand of a person (1) and the handle (2). A capacitance (C2) exists between the person (1) and the active portion (4) (second object) of the tool connected to a demodulator or tone decoder (8) in turn connected to a control unit (9) incorporating the control circuitry. The control unit (9) controls the security system (10) in turn controlling the protective measures such as braking or power cut-off (11). The control unit (9) also controls an alarm and self-testing circuitry (11a).

38 Claims, 7 Drawing Sheets

METHOD AND A DEVICE FOR SENSING THE DISTANCE BETWEEN A FIRST OBJECT AND A SECOND OBJECT

This application is the national phase under 35 U.S.C. §371 of prior PCT International Application No. PCT/DK96/00408 which has an International filing date of Sep. 25, 1996 which designated the United States of America, the entire contents of which are hereby incorporated by reference.

BACKGROUND OF THE INVENTION

This invention relates to a method and a device for sensing the distance between a first object and a second object being moved relative to each other and for activating or facilitating a predetermined action or predetermined actions when said distance has attained a value including zero.

In many situations, applications and processes it is useful and often essential that a certain action or certain actions be initiated or facilitated when one object attains a certain distance from another object during relative motion of the two objects.

SUMMARY OF THE INVENTION

A main purpose of the invention is to provide a method for automatically sensing attainment of said certain distance and automatically initiating or facilitating said certain action or actions.

According to the invention this is obtained by the method comprising the steps of generating a signal between either the first object and the second object, between the first object and a third object, between the second object and a third object or between a third object and a fourth object, monitoring the signal for sensing variations of the signal as the first object and the second object are moved relative to each other and activating the predetermined action when the signal has attained a predetermined condition.

One of the objects may be a portion of a human body or an electrical cable or any other object suitable for performing the method.

The method comprises an object closing or interrupting a circuit by the first object being interposed between two points which respectively may be coupled to a generator (for instance a handle) and a receiver (for instance a chain saw chain center piece). The first object may also be interposed between earth and an earthing sensitive electronic means (between the floor and a saw blade) or between the plates of a condenser, in magnetic or electromagnetic fields or in connection with a discharge of static electricity.

The object (for instance a portion of a human body) thus may function either—in the first case above—as a contact element in connection with a relative short circuit (as an electrical conduit) or—in the latter cases above—as a disturbance/alteration of an existing field.

This may be implemented by physical contact with two points (for instance two security contacts (for instance a so-called dead man switch) or some other protection of two handles—for instance a hand-held cutting or abrasion tool or a hedge trimmer) or at a defined distance—for instance the smallest distance/security distance between a dangerous tool portion and a portion of a human body.

More particularly, this invention relates to a method and a device for protecting an object such as for instance a portion of a human body or an electrical cable, from the action of an active portion of an apparatus such as for instance a hand-held power tool, a stationary processing machine, excavating equipment and the like.

In connection with such apparatus many accidents happen causing damage to human beings and material objects as a result of unintentional contact between said active portion and said object. This is for instance the case in connection with human operation of a great variety of tools, equipment and processing apparatus where it is necessary or possible for part of a human body to enter the field of action of the active part or where the active portion may come into unintentional engagement with an object such as for instance a conduit embedded in a wall of an edifice or in the ground.

Many methods and devices have been proposed to solve this problem or to diminish the risk of serious damage. Among these may be mentioned arranging a light beam curtain between the active portion and the object reacting to interruption of part of the light beam curtain by the object or the active portion, establishing an electromagnetic field around the object giving a signal to an antenna arranged in the vicinity of the active portion and so on.

These known methods and devices may function reasonably well in particular circumstances, but they usually limit the flexibility of use of the apparatus in question and the mobility of the apparatus and the operator thereof.

It is important that the protective system function quickly and reliably while allowing as great flexibility and mobility as possible.

It is a further purpose of the invention to provide a method of the type indicated which may be applied in connection with apparatus powered by electricity as well as by other energy sources, the apparatus being hand-held, stationary or mobile. The apparatus may for instance be circular saws, compass saws, chain saws, hedge cutters or trimmers, other garden appliances, planers, dressers, cutting, boring, machining, bending and punching machines, nail pistols, automatic doors, industrial robots, housekeeping, industrial and agricultural machinery as well as any other devices with potentially dangerous active portions.

This purpose is achieved according to the invention by a proximity signal being transmitted between a transmitting system and a receiving system, said object and said active portion each constituting a part of a respective one of said systems, the proximity signal being transmitted and received such that when the substantially shortest distance between the active portion and the object has a sufficiently small value, protective operations are activated for protecting said object from said action. The said value may be predetermined, fixed, variable, verifiable or adjustable or it may be self-defining in accordance with the particular circumstances of the situation.

It is important that the protective operations be chosen such that an optimal combination of security and practicality be achieved for each type of apparatus and for the various possible applications of each such type. Accordingly, the protective operations may comprise at least one of the following operations:

the energy powering at least part of the action of said active portion is interrupted, at least part of the action of said active portion is braked, at least part of said action is modified, the active portion or the object or both are displaced in a predetermined direction or predetermined directions, barrier means are displaced into a predetermined position in relation to either the active portion or the object or both, means for ameliorating the effects of said action on said object are activated, and an audible and/or a visible and/or a tactile alarm is generated.

Thus, if the action of the active portion entails a small amount of inertia it will be sufficient to interrupt the energy powering said action, while large inertia will require a positive braking action to avoid serious damage. Braking will be necessary in relation to chain saws, hedge cutters and the like, while interruption of the energy supply will suffice in the case of hydraulic presses, automatic doors, bending machines and the like.

Although various characteristics of the transmitted and received signal may be employed to indicate the security distance, such as for instance a time delay differential between two signal characteristics, a particularly simple and reliable method is obtained according to the invention by the intensity of the received proximity signal being indicative of the substantially shortest distance between said object and said active portion, and/or by the frequency of substantially regular oscillations of the proximity signal is indicative of the substantially shortest distance between said object and said active portion.

Preferably, the transmitted proximity signal contains a code to distinguish the proximity signal from irrelevant extraneous signals received by the receiving system. Hereby, it is ensured that only the proximity signal gives rise to the protective actions.

According to the invention, the transmitted proximity signal may be transmitted capacitively, electromagnetically, or it may be a radio frequency signal.

In the case of capacitive transmission of the proximity signal the method according to the invention preferably comprises the steps of:

applying an alternating voltage to one of said active portion and said object, comparing a reference threshold voltage amplitude with the voltage amplitudes of any displacement current capacitively transmitted by said alternating voltage through the other of said active portion and said object, and activating the protective operations if any of the current voltage amplitudes are larger than the threshold voltage amplitude.

Hereby a particularly simple, reliable and efficient method according to the invention is achieved allowing the use of relatively weak and relatively easily distinguishable signals that may be modified in various useful manners as described in the following.

In a protective method of the type in reference it is extremely important that it is ensured as far as possible that the security system is operative so that a false sense of safety is not imparted in case the security system has been rendered inoperative for some reason. Therefore, according to the invention, the action of the active portion may advantageously only be initiated if said proximity signal is being received with an intensity above a predetermined check intensity and/or an automatic check routine of said protective operations indicates that they are able to function properly.

Advantageously, one or more of the protective operations are activated if the intensity of the received proximity signal decreases below a predetermined check intensity. Hereby an unacceptable weakening of the signal activates protective measures reducing or eliminating the potential damage that may be caused by the active portion when is operative.

Advantageously, a second signal is transmitted by said transmitting system, the action of the active portion not being started or, if already having been started, being interrupted if said second signal is not received by said receiving system and/or an automatic check routine of said protective operations indicates that they are not able to function properly. Hereby the second signal functions as a verifying signal for verifying that the security system is operative. This signal may have a larger effective range or intensity than the proximity signal.

Advantageously, the alternating voltage may have a predetermined constant frequency, the amplitude comparison being substantially limited to said frequency.

According to the invention the displacement current, prior to the comparison, may be filtered to dampen alternating current components having a frequency different from a predetermined frequency. Hereby, extraneous signals will not readily give rise to undesired activation of the protective operations.

Advantageously, the method according to the invention may comprise the further steps of:

superimposing a coded sequence of voltage peaks on said alternating voltage, monitoring said alternating voltage for recognition of said coded sequence, and applying said recognition as a prerequisite for enabling said activation of protective operations. Hereby, further reduction of the possibility of undesired effects of extraneous signals is reduced further.

The active portion may be the blade portion of a hedge-cutting power tool and the object may be the power lead connecting the tool to a power source. Many other applications are possible and protecting the power lead of a hedge-trimmer is one of the very desirable applications in view of the large number of such tools in operation. The method may be applied to new hedge-trimmers or for retro-fitting existing hedge-trimmers. The method may also be applied to an chain-saw where the object is a portion of a human body and the active portion is the blade portion of the saw.

A particularly simple and effective method is achieved by the power lead in addition to the conductors for supplying the power from the power source furthermore comprises a conductor solely for transmitting or receiving the proximity signal.

The object may be a conductor such as an electrical cable or a metallic pipe embedded in a wall of an edifice or in the ground. In these cases the active portion may be drills, excavator buckets and so on.

The invention also relates to a device for sensing the distance between a first object and a second object being moved relative to each other and activating or facilitating a predetermined action or predetermined actions when said distance has attained a value including zero.

According to the invention the device comprises generating means for generating a signal between either the first object and the second object, between the first object and a third object, between the second object and a third object or between a third object and a fourth object, monitoring means for monitoring the signal for sensing variations of the signal as the first object and the second object are moved relative to each other and activating or facilitating means for activating or facilitating the predetermined action when the signal has attained a predetermined condition.

The device according to the invention may be intended for protecting an object, for instance a portion of a human body, from the action of an active portion of an apparatus such as a hand-held power tool, a stationary processing machine, excavating equipment and the like, a proximity signal being transmitted between a transmitting system and a receiving system, and according to the invention the device comprises generating means for generating the proximity signal, transmitting means for transmitting said signal, one of the object and the active portion constituting part of the transmitting means, receiving means for receiving said proximity signal, the other of the object and the active portion constituting part of the receiving means, protecting means for protecting the object from the action, monitoring means for continuously monitoring the received proximity signal for recognition of predetermined enabling conditions thereof, and activating means for activating the protecting means when said enabling conditions are recognized by the monitoring means. The enabling conditions may comprise predetermined conditions for the function of the system itself in addition to predetermined conditions for activating the protective means.

Preferably, the protecting means of the device according to the invention comprise at least one of the following:

disconnecting means for disconnecting at least part of the power supply to said active portion, braking means for braking at least part of the action of said active portion, modifying means for modifying the action, displacing means for displacing the active portion or the object or both in a predetermined direction or predetermined direction, barrier means for being displaced into a predetermined position in relation to either the active portion or the object or both, ameliorating means for ameliorating the effects of said action on said object, and warning means for emitting an audible and/or a visible and/or a tactile alarm.

According to the invention, the generating means may comprise means for applying an alternating voltage to one of the active portion and the object, the monitoring means may comprise means for comparing a reference threshold voltage amplitude with the voltage amplitudes of any displacement current capacitively transmitted by said alternating voltage through the other of said active portion and said object, and the activating means amy comprise means for activating the protecting means if any of the current voltage amplitudes are larger than the threshold voltage amplitude.

Advantageously, the alternating voltage may have a predetermined constant frequency, the amplitude comparison being substantially limited to said frequency.

Preferably, the monitoring means comprise filtering means for filtering the displacement current prior to the comparison to dampen alternating current components having a frequency different from the predetermined constant frequency.

So as to provide a particularly reliable device according to the invention the generating means further comprise coding means for superimposing a coded sequence of voltage peaks on said alternating voltage, the monitoring means further comprises recognizing means for seeking to recognize said coded sequence and enabling means for enabling said activating means as long as the coded sequence is being recognized.

The predetermined frequency is preferably in the range 10 hz–200 khz, more preferably in the range 1–150 khz and most preferably in the range 10–100 khz.

An advantageous embodiment is provided by the device being incorporated in a hand-held electrical hedge-cutting power tool comprising a conductive blade member, an electrical motor for operating the blade member and a power cable for connecting the motor to a power source, the device comprising generating means connected to one or more of the conductors of the cable for applying a constant frequency alternating voltage thereto, a conductor interconnecting the blade member with the monitoring means, a conductor interconnecting the monitoring means with the activating means. Other advantageous embodiments are devices incorporated in hand-held chain-saws, rotative saws and so on.

In such embodiments the device may further advantageously comprise an interrupter switch for the power supply to the motor and electrically interconnected with the activating means.

Advantageously, the device may further comprise braking means for braking the cutting action of the blade member and electrically interconnected with the activating means.

In the case of a hedge-cutter the power cable at least along a substantial part of the length thereof adjacent the hedge-cutter may advantageously comprise a dummy conductor additional to the power conductors, the generating means being connected to the dummy conductor for applying a constant frequency alternating voltage thereto. The generating means may be located in, on or adjacent to the hedge-cutter, at any location along the power cable or connected to the power mains or the power outlet plug.

So as to provide a particularly reliable device where the influence of extraneous objects the blade member may comprise a conductive element extending along at least part of the length of the blade member and being electrically insulated therefrom, the conductive element being electrically connected to the monitoring means and the rest of the blade member being electrically insulated therefrom. Hereby for instance the saw of a chain-saw may be grounded by contact with a tree trunk while the conductive element is not grounded thereby enabling the transmission of the signal while cutting a tree.

The conductive element may furthermore be entirely enclosed in the rest of the blade member.

Advantageously, the generating means, the monitoring means and the activating means may be arranged in an individual unit arranged externally of the apparatus, for instance on a power supply cable for the apparatus, the individual unit being provided with communicating means for communicating a signal to or from the monitoring means and the generating means from or to the active portion and the object, respectively. Hereby, a device is provided for retrofitting on existing power tools or for interchangeable fitting on several tools and so on.

The invention further relates to a hand-held hedge cutting power tool incorporating a device having the features defined in any of the appended claims 20–35.

The invention further relates to a hand-held chain-saw incorporating a device having the features defined in any of the claims 20–29 or claim 36 as dependant on any of the claims 21–29.

The invention furthermore relates to a method for measuring at least one distance between a measuring probe, the first object and a surface portion of a body, the second object, the method according to the invention comprising the steps of:

applying an alternating voltage with a predetermined constant frequency to one of said probe and said surface portion, locating the probe at at least one well-defined distance from the surface portion, registering and storing the value of the amplitude of the displacement current capacitively transmitted by said alternating voltage through the other of said probe and said surface portion, subsequently comparing the stored value with a new registered value corresponding to a different distance of the probe from the surface portion, utilizing the result of said comparison as a measure of the value of said different distance.

Hereby, the principles of the invention provide a method of automatically measuring a distance from an object in a very precise manner so as to inter alia allow very precise positioning relative to the object or a precise measurement of the distance between two points. Particularly, the method is useful for measuring very small distances very precisely. A very small distance between two points may be measured very precisely by moving the probe between the two points and subtracting the two corresponding values from one another, the probe having for instance cross hairs or even more precise electronic means for indicating coincidence of a reference point of the probe with the points between which the distance is to be measured.

The invention also relates to a device for measuring at least one distance between a measuring probe or the like and a surface portion of a body, the device according to the invention comprising:

applying means for applying an alternating voltage with a predetermined constant frequency to one of said probe and said surface portion, locating means for locating the probe at at least one well-defined distance from the surface portion, registering and storing means for registering and storing the value of the amplitude of the displacement current capacitively transmitted by said alternating voltage through the other of said probe and said surface portion, comparing means for subsequently comparing the stored value with a new registered value corresponding to a different distance of the probe from the surface portion.

Furthermore, the invention relates to a method for locating or positioning a first element at one or more certain points along a well-defined trajectory with respect to a second element, the method comprising the steps of:

applying an alternating voltage with a predetermined constant frequency to one of said elements, locating the first element at at least one well-defined location along said trajectory, for each location registering and storing the value of the amplitude of the displacement current capacitively transmitted by said alternating voltage through the second element, subsequently moving the first element along the trajectory while comparing the stored value with the new values of said amplitude being monitored, stopping the first element in its movement along the trajectory when the relevant stored value is equal to the new value.

Hereby, the principles of the invention inter alia provide a method of locating or positioning an element, for instance a tool of a robot apparatus at one or more desired positions relative to a part to be worked by the tool.

Finally, the invention relates to a device for locating or positioning a first element at at least one certain point along a well-defined trajectory with respect to a second element, the device according to the invention comprising:

applying means for applying an alternating voltage with a predetermined constant frequency to one of said elements, locating means for locating the first element at at least one well-defined location along said trajectory, registering and storing means for registering and storing, for each such location, the value of the amplitude of the displacement current capacitively transmitted by said alternating voltage through the second element, monitoring means for monitoring the new values of said amplitude while subsequently moving the first element along the trajectory comparing means for comparing the stored value with the new values of said amplitude stopping means for stopping the first element in its movement along the trajectory when the relevant stored value is equal to the new value.

BRIEF DESCRIPTION OF THE DRAWINGS

The method and device according to the invention will be ex-plained more in detail in the following with reference to the embodiments illustrated solely by way of example in the accompanying drawing, where FIG. 1 diagrammatically represents the circuitry of a generator of the signal, FIG. 2 diagrammatically represents the circuitry of a receiver of the signal, FIG. 3 schematically illustrates the application of the device to a hand-held chain saw, FIG. 4 diagrammatically illustrates the main elements of a personal security system incorporating an embodiment of the device according to the invention FIG. 5 diagrammatically illustrates a device according to the invention applied in a hand-held hedge-cutter, FIG. 6 diagrammatically illustrates a device according to the invention applied in a hand-held drilling tool, FIG. 7 diagrammatically illustrates a device according to the invention applied to a stationary rotary saw,

DETAILED DESCRIPTION OF THE PREFERRED EMBODIMENT

Figure 1:
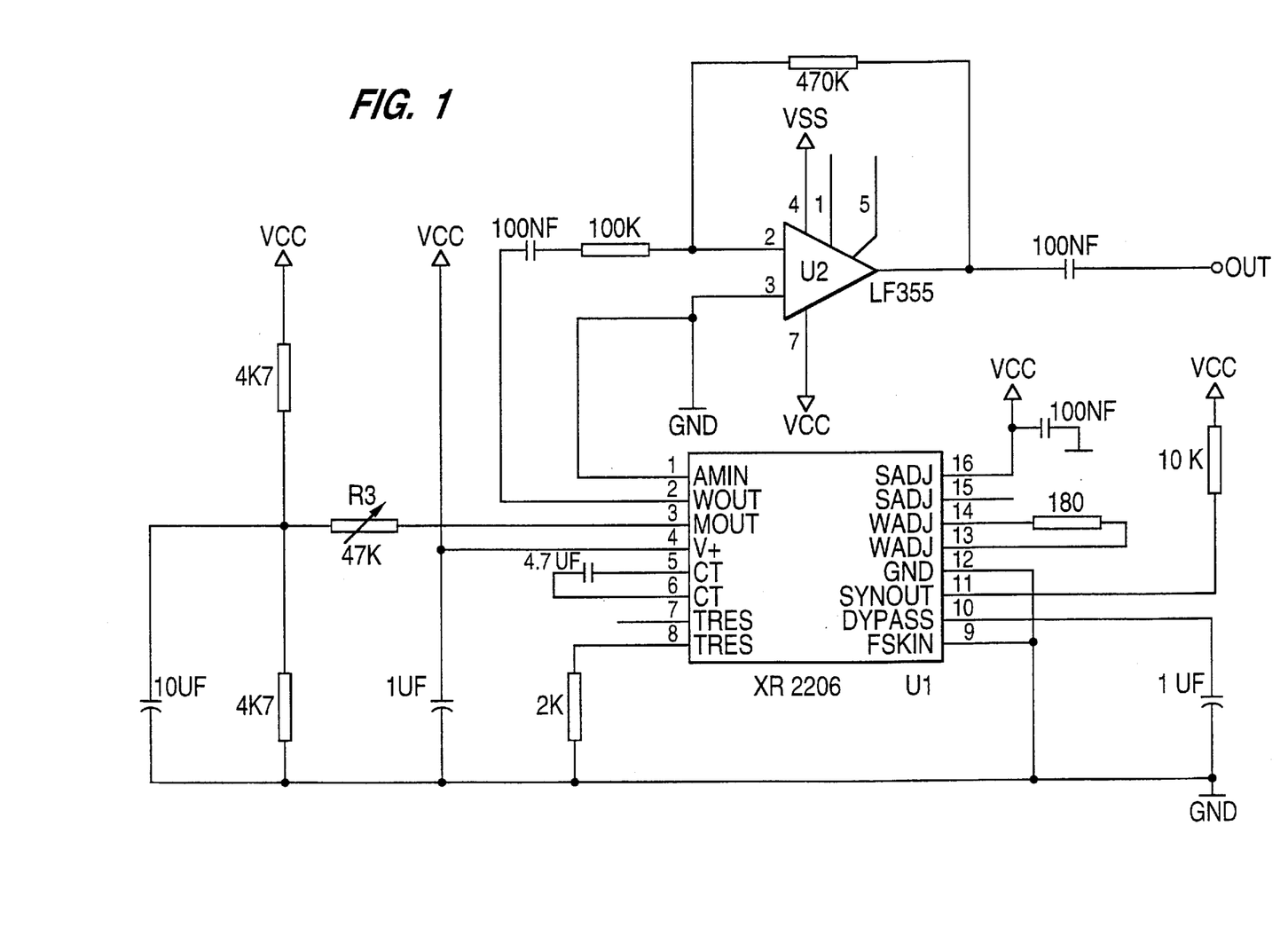
Figure 2:
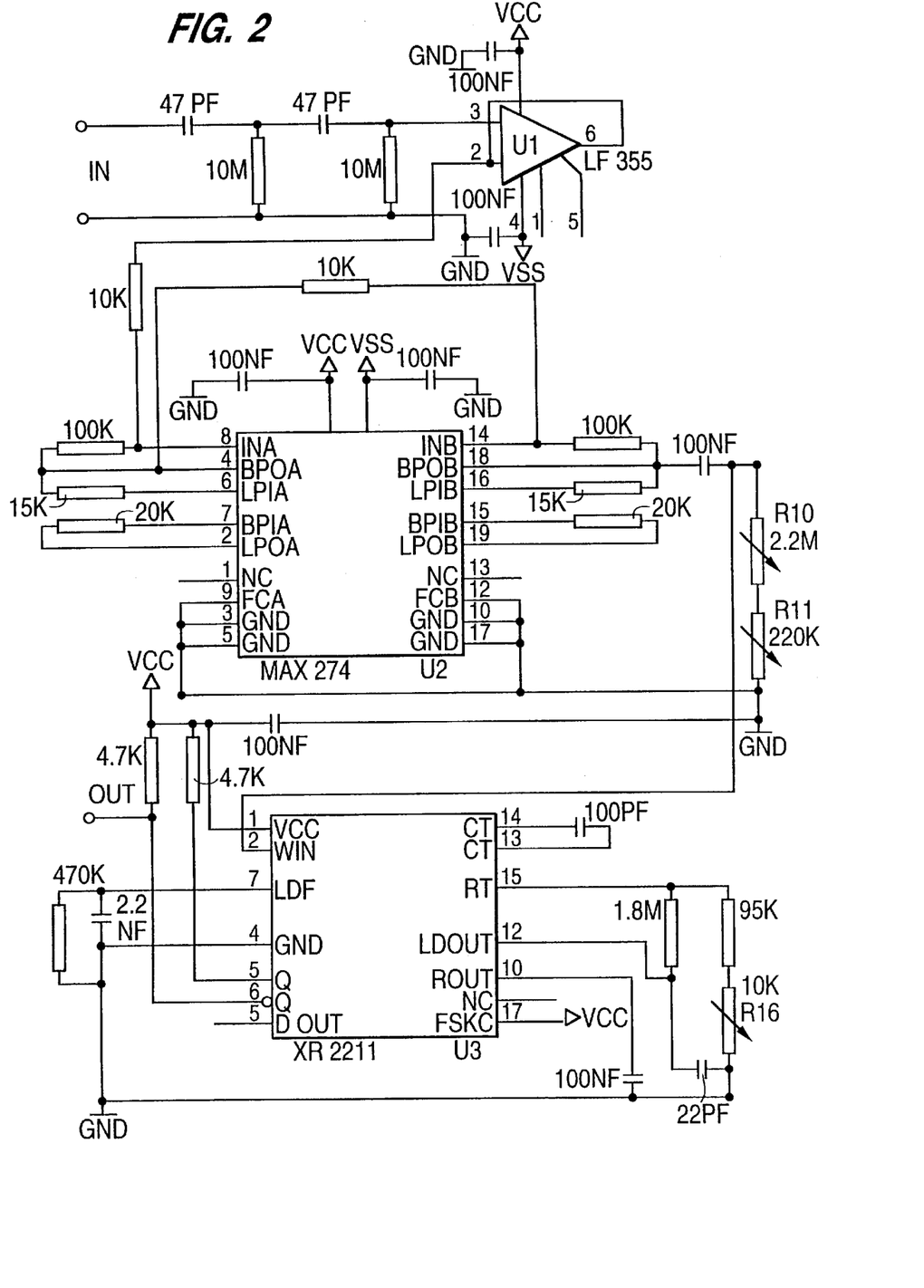
Figure 3:
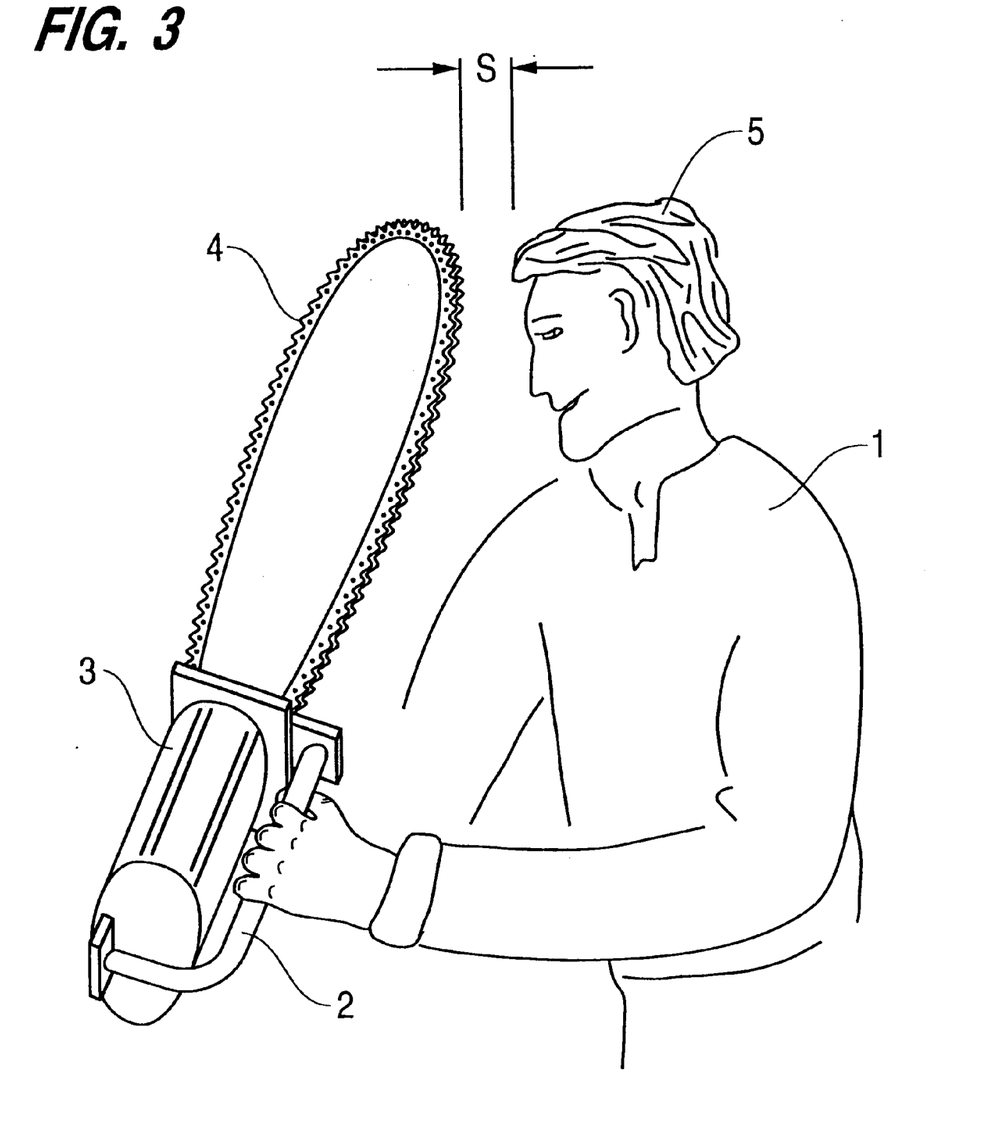

Referring to FIGS. 1, 2 and 3, the generator and the receiver, respectively, of a device according to the invention and the application of same to a hand-held chain-saw are diagrammatically represented. The generator is connected to the object to be protected, for instance a person 1 holding a handle 2 of a power tool (chain-saw) 3 connected to the generator. The receiver is connected to the potentially dangerous active portion, for instance a chain blade member 4 of the chain-saw 3. The security distance S between, in the depicted situation, the head 5 of the person 1 and the blade member 4 of the chain-saw is the distance at which the signal generated by the generator, conducted to the person 1 and transmitted to the receiver through the blade member 4 complies with the conditions necessary for activating protective measures, for instance interrupting the power to the tool, engaging a braking mechanism or reversing the direction of the electrical current to the electrical motor driving the active portion.

In the embodiment of the device corresponding to FIGS. 1 and 2 the signal is transmitted capacitively between the object (e.g. person 1) to be protected and the active portion (e.g. blade member 4). The generator generates a signal of for instance 100 khz. When a sufficiently intense 100 khz capacitively transmitted signal is detected by the receiver, the protective measures are activated.

The 100 khz signal is generated (FIG. 1) by the signal generator XR-2206 generating a sinusoidal signal of 100 khz with a variable amplitude between 0–3 volts peak. The amplitude is adjusted by means of the variable resistance R3. The signal is amplified by a operation amplifier LF 355 so that the whole generator unit may deliver a 100 khz signal with an amplitude of between 0–12 volt peak. The output (OUT) is connected to a conductor (cable, plate or the like) for conducting the signal to the object (for instance to the handle 2 of the tool for being conducted to the person 1) serving as a transmitter of the signal.

In the receiver (FIG. 2) the input (IN) is connected to a conductor on, in or connected to the active portion (e.g. blade member 4) so that the capacitive effect between the object and the active portion may be exploited. A high-pass filter in the input includes of two resistances and two condensers. The filter dampens any received 50 Hz signal but lets a 100 khz signal through. The amplitude of the signal passing through is, however, determined by the total filter effect between the passive filter in the input and the capacity between the object (person 1) and the active portion (blade member 4). The larger this capacity is (the capacity increases the closer the object approaches the active portion) the larger is the 100 khz signal passing through. After the filter the signal passes through a one-way amplifier functioning as an impedance adaptation between the passive high-pass filter and an active band-pass filter MAX274. The active band-pass filter is a 100 khz filter of the fourth order with a very narrow band width that ensures that noise is filtered out (50 Hz noise, machine noise etc.). The signal is thereafter detected by a very selective tone detector XR2211 the threshold of the detected signal is adjusted by two variable resistances R10 and R11. When the tone detector detects a 100 khz signal with the desired amplitude the output (signal detect output) goes from low (logical "0") to high (logical "1"). This signal (signal detect output) may be used to activate protective measures such as a braking mechanism controlled by for instance a relay or by triac.

Figure 4:
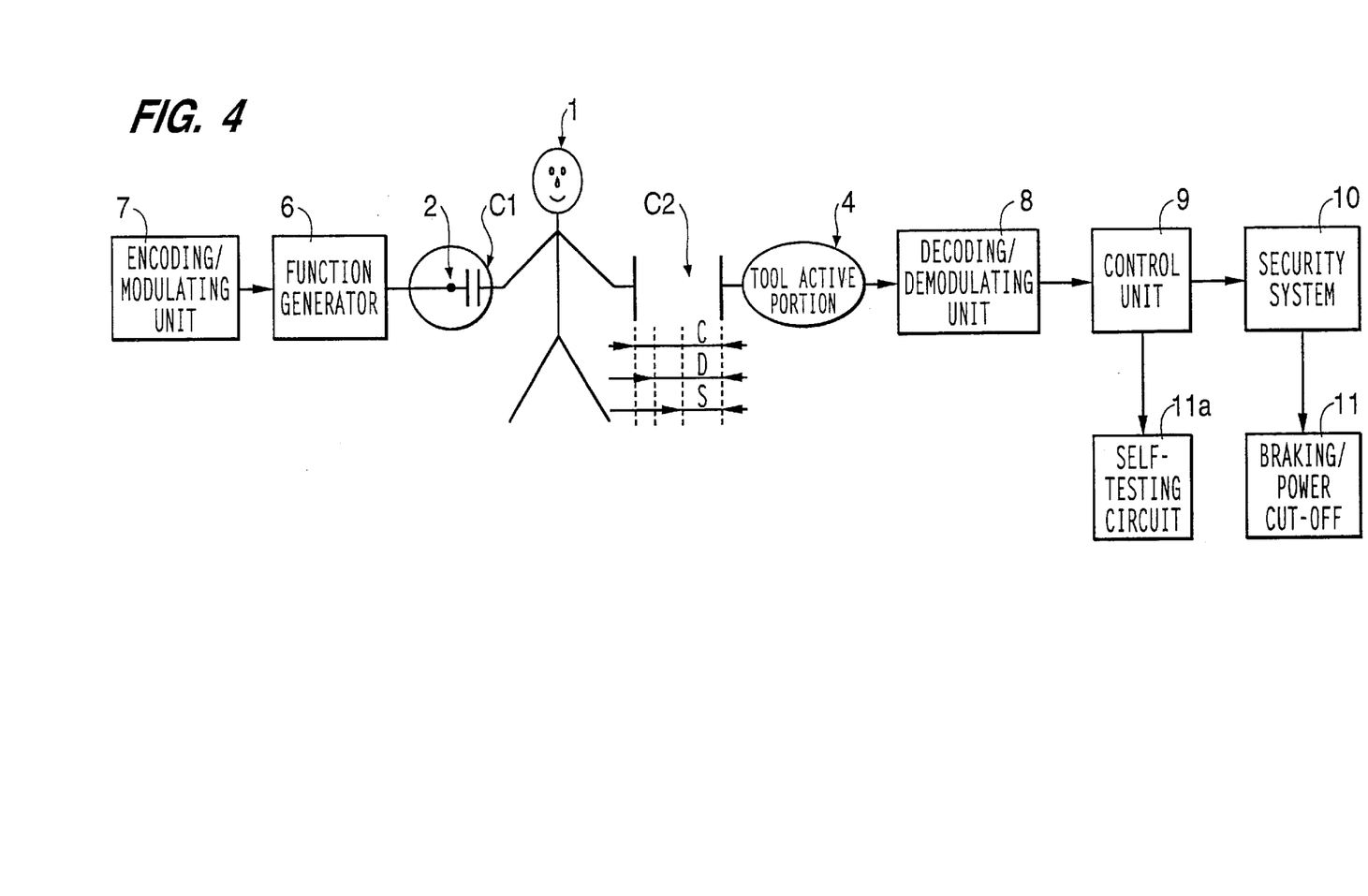

FIG. 4 illustrates the main elements of a personal security system incorporating an embodiment of the device according to the invention.

A person 1 holds a handle 2 of a power tool, the handle being connected to a function generator 6 for a signal in turn connected to a unit 7 for encoding or modulating the signal. A capacitance C1 exists between the hand of the person 1 and the handle 2. A capacitance C2 exists between the person 1 and the active portion 4 of the tool connected to a demodulator or tone decoder 8 in turn connected to a control unit 9 incorporating the control circuitry, for instance as described in relation to FIG. 2. The distance indicated by C is the check distance at which the check signal is received, The distance D is a working (i.e. allowable) distance and the distance S is the security (i.e. minimum) distance. The control unit 9 controls the security system 10 in turn controlling the protective measures such as braking or power cut-off 11. The control unit 9 also controls an alarm and self-testing circuitry 11a.

Figure 5:
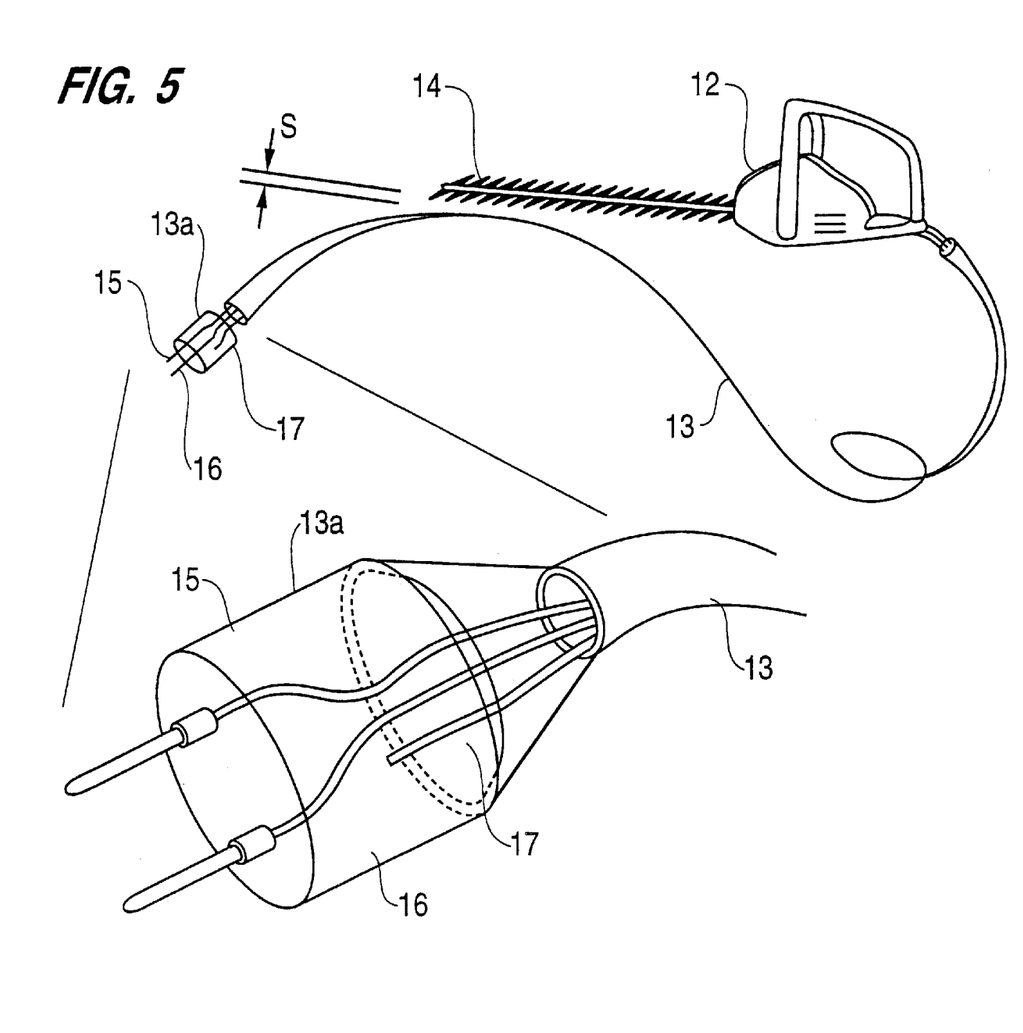

FIG. 5 diagrammatically illustrates a device according to the invention applied in a hand-held hedge-cutter. A hedge-cutter 12 incorporates a signal generator for generating a signal conducted to the power lead 13 and received by the blade member 14. The security distance S represents the distance at which the signal is received with conditions necessary to activate protective measures to avoid damaging the power lead 13 by the blade member 14. The power lead may in addition to the conductive cables 15 and 16 incorporate a dummy cable 17 connected to the signal generator as indicated in the enlarged detail of the plug 13a of the power lead.

The signal generator and/or the signal receiver and/or the activator for protective measures may be incorporated in a separate unit arranged between the tool 12 and the power lead 13 or at an intermediate point of the power lead 13 or in the plug unit 13a of same having the necessary connections to the tool through additional conductors in the power lead 13. In these cases, the device may also be retrofitted to existing tools.

The security system for protecting the power lead of a handheld tool may have components (e.g. a dummy cable similar to dummy cable 17 above) built into a light-weight, flexible, tough casing arranged around the power lead so that an additional safe-guard of the power lead is attained. Such a casing may also be used per se to protect the power lead.

Figure 6:
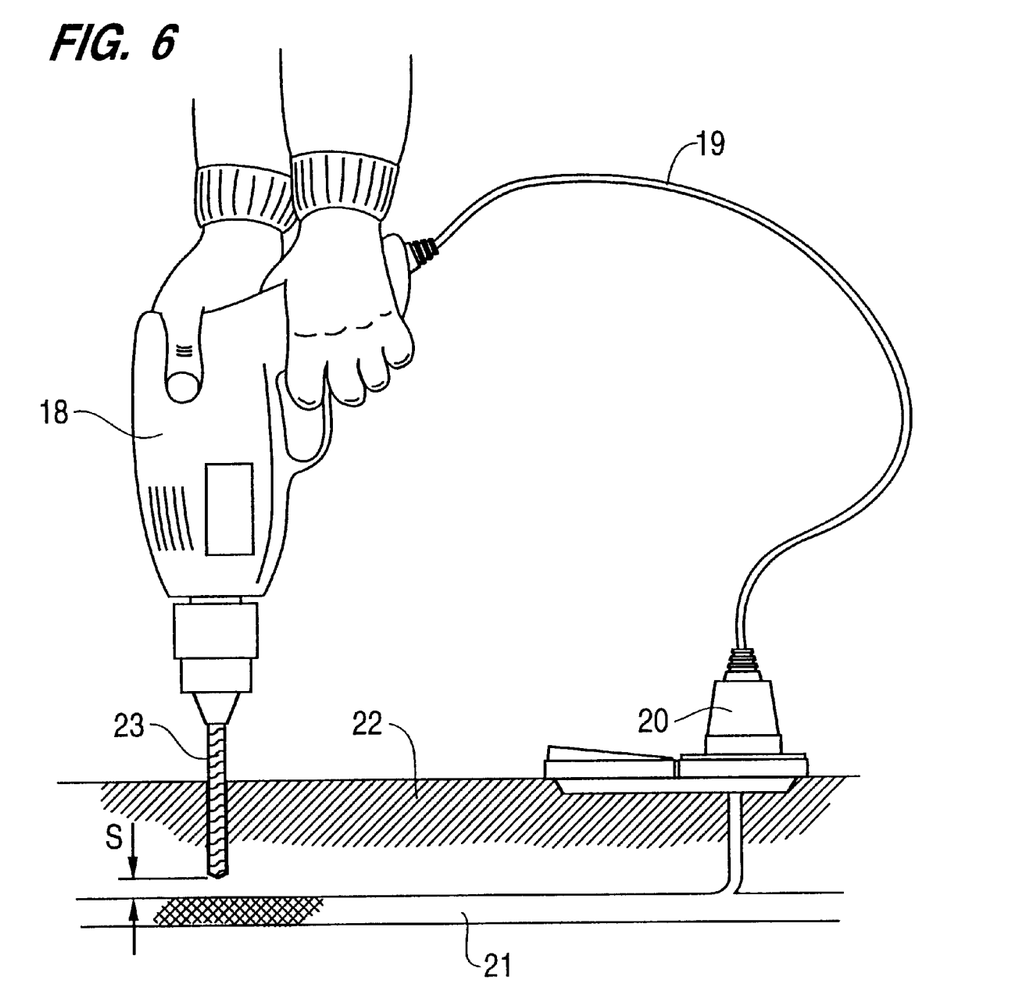

FIG. 6 diagrammatically illustrates a device according to the invention applied in a hand-held drilling tool for protecting electrical cables embedded in walls. A hand-held drilling tool 18 incorporating a device according to the invention is connected through the power lead 19 to a plug element 20 connected to an electrical cable 21 embedded in a wall 22. A drill 23 and the power lead 19 are connected to the generator and receiver of the device. The security distance S represents the distance at which the signal is received with conditions necessary to activate protective measures to avoid damaging the power cable 21 by the drill 23.

The signal may alternatively be generated separately for the electrical system in the building, in which case the tool only includes the receiver and activating means for protective measures, the receiver being calibrated in accordance with the separate generating system in the respective building. A standard generating system for all buildings may be established so that all power tools may be used with a single standard calibration.

Similar systems may be established to protect cables and conductive conduits in the ground from excavating and drilling equipment similarly calibrated.

Figure 7:
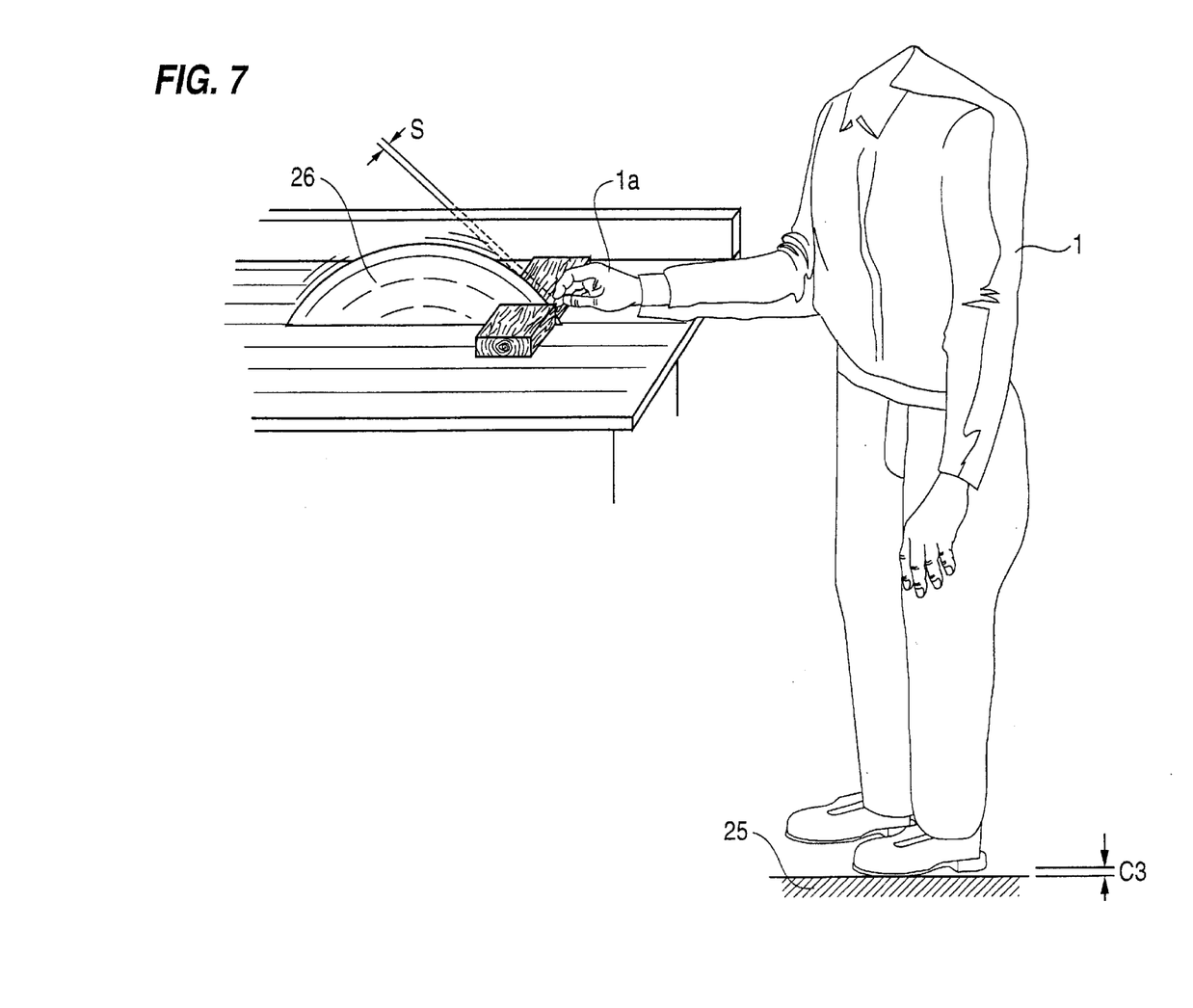

FIG. 7 diagrammatically illustrates a device according to the invention applied to a stationary rotary saw, a person 1 standing on a conductive plate 25 or the like connected to a signal generator or some fixed potential, for instance ground, a capacitance C3 existing between the plate 25 and the person 1. A rotary saw blade 26 is connected to a signal receiver and the activating means for the protective measures. The security distance S represents the distance at which the signal is received with conditions necessary to activate protective measures to avoid damaging a hand 1a by the rotary saw blade 26. The system accepts lack of direct contact between the person 1 and the plate 25 illustrating that the signal may also be transmitted capacitively at intermediate points. Naturally the hand 1a may be covered by a protective glove or the like without impeding the correct function of the security system.

The applications of the method and the device according to the invention are numerous and varied.

One very useful application is for very precisely positioning a first object at a certain distance from a second object along a well-defined trajectory for the first object relative to the second object. The first object connected to a signal generator according to the invention is located at one or more positions along the trajectory in which positions it is desired that the first object be stopped when moving along the trajectory. The relevant parameter or parameters of the signal being received by the second object connected to a signal receiver according to the invention are recorded. The recorded values are thereafter used for comparison with the corresponding parameter or parameters of the signal transmitted as the first object moves along the trajectory, the first object being stopped when the recorded values are equal to the new, varying values.

A very useful application of this system is in the use of robots in assembly lines or other situations, the whole or part of the robotic element being the first object and the element to interact with the robot being the second object.

Another very useful application of the method and the device according to the invention is for measuring a distance between a probe or the like, the first object, and a surface portion of a body, the second object, by compiling a database of values for relevant parameters of the signal being received at a multiplicity of locations of the objects relative to each other, the data-base preferably also containing corresponding at least approximate spatial values of for instance coordinates, orientation and so on. Hereby, a distance to be measured may be arrived at by interpolating or otherwise evaluating the relevant parameter or parameters of the signal (and preferably the corresponding spatial values) for the actual location to be measured with regard to values stored in the data-base. Naturally, a distance between two positions of the probe may also be measured in this manner, thereby being able to measure linear (or curvilinear) distances between two points by means of the method and the device according to the invention.

Extremely small distances may be measured very precisely by means of the method and the device as the achievable sensitivity is extremely high.

When applying the method and the device according to the invention to for instance hand-held gardening power tools such as for instance a hedge-cutting tool it has been determined by the inventor that the security signal is easily transmitted capacitively from a person through for instance a hedge to the blade member of the tool and vice versa. This may entail an undesired activation of the protective actions.

This problem may be solved for instance by grounding the earth side (i.e. the cold side) of the receiver and/or the transmitter, as the hedge/bush/tree, of course, is grounded and therefore has the same potential as the earth side and therefore cannot transmit a signal to/from the receiver/transmitter (i.e. to/from the hot end).

Grounding of the earth side may be achieved in several ways such as for instance earth rods connected to the machine, earth from for instance a special cable drum with an earth rod or a metal plate or the neutral wire from the mains may be used as earth. The preferred solution in electrically powered machines is to employ a capacitive potential between phase and neutral.

Under special working conditions the security system may be temporarily interrupted by means of a small pressure (spring-biased interrupter). In such case it is presupposed that an interruption will activate for instance an audible alarm to warn the operator that the security system is inactive. The alarm may also be used in case the security distance has been reduced because of grounding or some malfunction of the system.

Another type of accidental or unintentional activation of the security measures takes place in situations where the dangerous machine portion is electrically connected to parts of the machine in contact with or proximate to the operator during the normal course of the work to be performed. This problem is solved by isolating the dangerous portion of the machine from the secondary parts of the machine normally approached by the operator, or alternatively by isolating said parts of the machine from the operator. At the same time the earth connection generally connected to the secondary machine parts may be modified such that said machine parts are only partly grounded as regards high frequency signals. Hereby it is, on the one hand, avoided that the signal is unintentionally capacitively transmitted via the secondary machine parts to the dangerous portion of the machine and, on the other hand, avoided that the operator is not totally grounded in relation to the security signal.

A corresponding problem may arise when mechanically processing animals that under certain circumstances may conduct the signals by contact or proximity—thereby unintentionally activating the protective measures. Correspondingly, this problem is solved by means of a partial or total grounding of the animal.

In many situations the intensity of the signal transmitted by the operator/dangerous portion should be constant so that the security distance is as constant as possible for a given situation. This may be achieved by for instance providing for that the generator supplies a constant signal intensity to the transmitting object irrespective of the size of the capacity between the generator and said object (e.g. operator). Alternatively, the variations of said capacity may be minimised by for instance on beforehand to provide a relatively large distance between the generator and the object (operator). This will for instance allow an operator to use gloves when the signal is transmitted through a handle. In connection with stationary machines there may be established a stable connection in the form of for instance a bracelet or arm band connected by a wire to the machine or in the form of an arm band comprising a battery powered transmitter.

In connection with certain hand-held machines with two handles the front handle may be placed within the security distance and may thereby unintentionally activate the protective measures. This problem may be solved by capacitively grounding the front handle. This design may also be used for calibration and to activate the protective measures if one handle is released or is knocked out of the hand.

Certain problems arise from smaller variations in the security distance, for instance in chain-saws depending on whether the edge or the flat of the blade approaches the operator. These problems are minimised by embedding small metal portions isolated from the blade and connected with the receiver or the transmitter. Alternatively, further criteria are used to measure the distance—for instance a temporal factor.

It should be noted that the invention as defined herein and in the appended claims has a multiplicity of applications and wide perspectives that will be obvious to those skilled in the art. As a further examples of the wide variety of applications may be mentioned incorporating a transmitter in hand guns in general and attaching a receiver to for instance a police officer. Alarm will be given to the police officer when a hand gun is within a certain range. Different codes in the signals may indicate the type of hand gun, police gun or not and so on. So as to avoid dependency on batteries, the hand gun transmitters may be provided with passive components influenced by an outside source or potential may be inductively supplied to the receiver from an outside source. The hand gun may also influence a transmitted signal.

Finally, another useful application that may be mentioned is to protect persons from harm caused by live wires in for example buildings or other installations. The security signal is supplied to the electrical installation comprising the live wire. By touching or nearly touching the live wire the signal will be diverted through the person to earth. This change will be detected and activate an alarm or interruption of the current. The advantage of the system is that it will be possible to protect a person against harm when touching both phase and neutral at the same time thereby avoiding electrocution by short-circuit through the person.

I claim:

1. A method for sensing the distance between a first object and a second object being moved relative to each other and for-activating or facilitating a predetermined action or predetermined actions when said distance has attained a value including zero, the method comprising the steps of transmitting a capacitive proximity signal between a transmitting system and a receiving system,
the first object and the second object each constituting an integral part of a respective one of the systems and a part of the signal path of the proximity signal, and
the proximity signal providing indication of distance between the first object and the second object, and monitoring the proximity signal for sensing variations of the signal as the first object and the second object are moved relative to each other, and activating the predetermined action when the signal has attained a predetermined condition.

2. A method according to claim 1 for protecting the first object from interaction with the second object.

3. A method according to claim 2, wherein
the second object is an active portion of an apparatus,
the proximity signal provides indication of distance between the object and the active portion, and
the predetermined action comprises activating a protective operation for preventing the first object from interaction with the active portion when the proximity signal indicates that the distance is shorter than a predetermined security distance.

4. A method according to claim 3, further comprising at least one of the steps:

interrupting supply of energy for at least part of the active portion, braking at least part of the active portion, displacing the active portion and/or the object in a predetermined direction or predetermined directions, positioning barrier means in a predetermined position in relation to either the active portion or the object or both, activating means for ameliorating the effects of the interaction between the object and the active portion, and generating an audible and/or a visible and/or a tactile alarm.

5. A method according to claim 1, wherein the intensity of the proximity signal is indicative of the distance between the first object and the second object.

6. A method according to claim 1, wherein the frequency of substantially regular oscillations of the proximity signal is indicative of the distance between the first object and the second object.

7. A method according to claim 1, further comprising the step of encoding the proximity signal whereby the proximity signal is made distinguishable from irrelevant extraneous signals.

8. A method according to claim 1, wherein the step of transmitting a proximity signal comprises the steps of:

forming an electronic circuit comprising the object and the active portion, applying an alternating voltage to the electronic circuit, and wherein indicating that the distance between the object and the active portion is shorter than a predetermined security distance comprises the steps of:

detecting alternating current flowing in the circuit in response to the alternating voltage, and indicating that a parameter of the alternating current attains a predetermined reference value.

9. A method according to claim 1, wherein the action of the active portion may only be initiated if the proximity signal is being received with an intensity above a predetermined check intensity and/or an automatic check routine of the protective operations indicates that they are able to function properly.

10. A method according to claim 1, wherein the predetermined operation is activated if the intensity of the received proximity signal increases above a predetermined check intensity.

11. A method according to claim 1, wherein a second signal is transmitted by the transmitting system, the action of the active portion not being started or, if already having been started, being interrupted if the second signal is not received by the receiving system and/or an automatic check routine of the protective operations indicates that they are not able to function properly.

12. A method according to claim 7 wherein the current, prior to the comparison, is filtered to dampen alternating current components having frequencies different from predetermined frequencies.

13. A method according to claim 8, further comprising the steps of:

superimposing a code on the alternating voltage, monitoring the alternating voltage for recognition of the code, and applying the recognition as a prerequisite for enabling the activation of protective operations.

14. A method according to claim 1 and for measuring at least one distance between a measuring probe or the like and a surface portion of a body, the method comprising the steps of:

applying an alternating voltage to one of the probe and the surface portion, locating or positioning the probe at at least one well-defined distance from the surface portion, registering and storing the value of the amplitude of the current capacitively transmitted by the alternating voltage through the other of the probe and the surface portion, subsequently comparing the stored value with a new registered value corresponding to a different distance of the probe from the surface portion, utilizing the result of the comparison as a measure of the value of the different distance.

15. A method according to claim 1 and for locating or positioning a first element at at least one certain point along a well-defined trajectory with respect to a second element, the method comprising the steps of:

applying an alternating voltage to one of the elements, locating or positioning the first element at at least one well-defined location along the trajectory, for each location registering and storing the value of the amplitude of the current capacitively transmitted by the alternating voltage through the second element, subsequently moving the first element along the trajectory while comparing the stored value with the new values of the amplitude being monitored, stopping the first element in its movement along the trajectory when the relevant stored value is equal to the new value.

16. A method of identifying a human incorporating the features defined in claim 1.

17. A device for protecting an object from interaction with an active portion of an apparatus, having an electronic circuit comprising the object and the active portion capacitively connected in series, generating means for generating an alternating voltage and connected in series with the object and the active portion, monitoring means for detecting alternating current flowing through the object in response to the alternating voltage and for generating an output signal when a parameter of the alternating current attains a predetermined reference value, and protecting means for preventing the object from interaction with the active portion and activated in response to the output signal.

18. A device according to claim 17, wherein the protecting means comprise at least one of the following:

disconnecting means for disconnecting at least part of the power supply to the active portion, braking means for braking at least part of the action of the active portion, modifying means for modifying the action, displacing means for displacing the active portion or the object or both in a predetermined direction or predetermined direction, barrier means for being displaced into a predetermined position in relation to either the active portion or the object or both, ameliorating means for ameliorating the effects of the action on the object, and warning means for emitting an audible and/or a visible and/or a tactile alarm.

19. A device according to claim 17, wherein the alternating voltage has a predetermined constant frequency.

20. A device according to claim 17, wherein the monitoring means comprise filtering means for filtering the current in order to attenuate alternating current components having a frequency different from frequencies of the alternating voltage.

21. A device according to claim 17, wherein the generating means further comprise coding means for encoding the proximity signal with a code, and the monitoring means further comprises recognizing means for recognition of the code and enabling means for enabling activation of the protecting means upon recognition of the code.

22. A device according to claim 17, wherein the generating means operates at frequencies in the range of 10 Hz–200 kHz.

23. A device according to claim 17, wherein the operating frequencies are in the range of 1 kHz–150 kHz.

24. A device according to claim 17, wherein the operating frequencies are in the range of 10 kHz–100 kHz.

25. A device according to claim 17, incorporated in a hand-held electrical hedge-cutting power tool comprising a conductive blade member, an electrical motor for operating the blade member and a power cable for connecting the motor to a power source, the device comprising generating means connected to one or more of the conductors of the cable for applying an alternating voltage thereto, a conductor interconnecting the blade member with the monitoring means, a conductor interconnecting the monitoring means with the activating means.

26. A device according to claim 25, wherein the device further comprises an interrupter switch for the power supply to the motor and connected with the output signal.

27. A device according to claim 25, wherein the device further comprises braking means for braking the cutting action of the blade member and electrically interconnected with the activating means.

28. A device according to claim 25, wherein the power cable at least along a substantial part of the length thereof adjacent the tool comprises a dummy conductor additional to the power conductors, the generating means being connected to the dummy conductor for applying an alternating voltage thereto.

29. A device according to claim 25, wherein the blade member comprises a conductive element extending along at least part of the length of the blade member and being electrically insulated therefrom, the conductive element being electrically connected to the monitoring means and the rest of the blade member being electrically insulated therefrom.

30. A device according to claim 29, wherein the conductive element is entirely enclosed in the rest of the blade member.

31. A device according to claim 17, wherein the generating means and the monitoring means are arranged in an individual unit arranged externally of the apparatus, for instance on a power supply cable for the apparatus, the individual unit being provided with communicating means for communicating a signal to or from the monitoring means and the generating means from or to the active portion and the object, respectively.

32. A device according to claim 17 and for measuring at least one distance between a measuring probe or the like and a surface portion of a body, the device comprising:

applying means for applying an alternating voltage to one of the probe and the surface portion, locating means for locating or positioning the probe at at least one well-defined distance from the surface portion, registering and storing means for registering and storing the value of the amplitude of the current capacitively transmitted by the alternating voltage through the other of the probe and the surface portion, comparing means for subsequently comparing the stored value with a new registered value corresponding to a different distance of the probe from the surface portion.

33. A device according to claim 17 and for locating or positioning a first element at at least one certain point along a well-defined trajectory with respect to a second element, the device comprising:

applying means for applying an alternating voltage to one of the elements, locating means for locating or positioning the first element at at least one well-defined location along the trajectory, registering and storing means for registering and storing, for each such location, the value of the amplitude of the current capacitively transmitted by the alternating voltage through the second element, monitoring means for monitoring the new values of the amplitude while subsequently moving the first element along the trajectory, comparing means for comparing the stored value with the new values of the amplitude, stopping means for stopping the first element in its movement along the trajectory when the relevant stored value is equal to the new value.

34. A hand-held hedge cutting power tool incorporating a device having the features defined in claim 17.

35. A hand-held chain-saw incorporating a device having the features defined in claim 17.

36. A portable apparatus incorporating a device having the features defined in claim 17.

37. A stationary apparatus incorporating a device having the features defined in claim 17.

38. An apparatus for identification of a human incorporating a device having the features defined in claim 17.

* * * * *